United States Patent
Takeda et al.

(10) Patent No.: US 6,872,008 B2
(45) Date of Patent: Mar. 29, 2005

(54) CONVERSION SLEEVE AND OPTICAL ADAPTER

(75) Inventors: Hideki Takeda, Sendai (JP); Yasutomo Kawahara, Kurobe (JP); Kenji Nozue, Toyama-ken (JP); Tadashi Yamaguchi, Kurobe (JP)

(73) Assignee: YKK Corporation, Tokyo (JP)

( * ) Notice: Subject to any disclaimer, the term of this patent is extended or adjusted under 35 U.S.C. 154(b) by 0 days.

(21) Appl. No.: 10/394,540

(22) Filed: Mar. 21, 2003

(65) Prior Publication Data

US 2003/0231838 A1 Dec. 18, 2003

(30) Foreign Application Priority Data

Mar. 22, 2002 (JP) .......................................... 2002-81909
Apr. 4, 2002 (JP) ....................................... 2002-102871

(51) Int. Cl.$^7$ .............................................. G02B 6/38
(52) U.S. Cl. ........................................................ 385/60
(58) Field of Search ............................... 385/53, 55, 60, 385/70, 72, 73, 76, 77, 78, 139; 439/654, 752.5, 948

(56) References Cited

U.S. PATENT DOCUMENTS

| | | | | |
|---|---|---|---|---|
| 4,969,845 A | * | 11/1990 | Hauchard et al. | 439/750 |
| 5,093,878 A | * | 3/1992 | Haley et al. | 385/92 |
| 5,142,601 A | * | 8/1992 | Shibata et al. | 385/86 |
| 5,282,259 A | * | 1/1994 | Grois et al. | 385/84 |
| 6,097,873 A | * | 8/2000 | Filas et al. | 385/140 |
| 6,164,835 A | * | 12/2000 | Imasaki | 385/72 |
| 6,367,984 B1 | * | 4/2002 | Stephenson et al. | 385/53 |
| 6,450,696 B1 | * | 9/2002 | Omiya et al. | 385/72 |
| 6,572,417 B2 | * | 6/2003 | Katsuma | 439/752.5 |

FOREIGN PATENT DOCUMENTS

JP 9-90169 4/1997

* cited by examiner

Primary Examiner—Thanh-Tam Le
(74) Attorney, Agent, or Firm—Michael S. Leonard; Everest Intellectual Property Law Group (57) ABSTRACT

In a conversion sleeve comprising a large diameter part, a small diameter part, and a tapered diameter part interconnecting said two parts, a ferrule insertion stop part is formed on an inner circumferential surface of the tapered diameter part and/or inner circumferential surfaces of the large diameter part and the small diameter part adjacent to the tapered diameter part. An optical adapter comprises a split sleeve having a slit formed therein throughout the entire length in the longitudinal direction thereof, particularly a conversion sleeve, and an adapter housing having a sleeve retaining part in which the sleeve is inserted and retained. The sleeve retaining part is provided with an engagement part comprising a recessed portion or/and a projected portion. The split sleeve is provided with a counter engagement part comprising a projected portion or/and a recessed portion which engages with the recessed portion or/and the projected portion of the engagement part.

4 Claims, 11 Drawing Sheets

CONVERSION SLEEVE AND OPTICAL ADAPTER

BACKGROUND OF THE INVENTION

1. Field of the Invention

This invention relates to a conversion sleeve and an optical adapter to be used for interconnecting optical connectors of the optical fiber cable ends which are used in optical communications, particularly the conversion sleeve and the conversion adapter to be used for interconnecting optical connectors containing ferrules having different diameters.

2. Description of the Prior Art

In an optical connector which is used to facilitate the connection and the disconnection of two optical fibers or of an optical fiber and other optical element, like the SC type optical connector, for example, the predominantly used system comprises fitting one end of an optical fiber into an axial through-hole of a ferrule and inserting two ferrules thus prepared into an alignment sleeve of an optical adapter through the opposite ends thereof to abut end faces of the ferrules against each other.

The use of the sleeve for aligning the ferrules each having an optical fiber inserted and fixed therein by abutting end faces thereof against each other includes the case where the optical connectors having the same ferrule diameter are mutually connected and the case where the optical connectors having different ferrule diameters are mutually connected. In the latter case, a conversion sleeve is used. The modes of conversion sleeves are divided into two main classes; a precision sleeve having no slit and an elastic sleeve having a slit (split sleeve).

Figure 1:
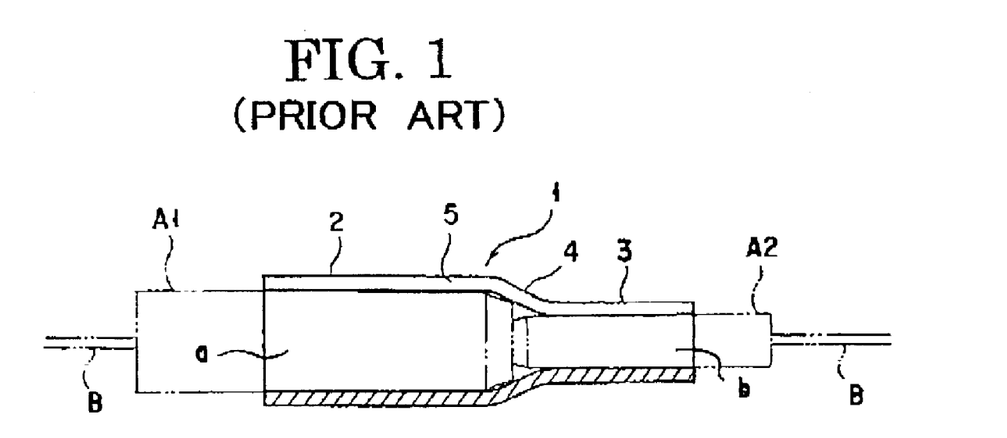
FIG. 1 is a longitudinal cross-sectional view schematically illustrating an example of the conventional conversion sleeve.

AS an elastic sleeve, the structures as shown in FIG. 1 is known in the art, for example, as disclosed in published Japanese Patent Application, JP 9-90169 A.

The conversion sleeve 1 shown in FIG. 1 is a split sleeve comprising a large diameter part 2 having a large diameter through-hole "a", into which a large diameter ferrule A1 having an optical fiber B inserted and fixed therein is fitted, and a small diameter part 3 formed by reducing a diameter in one end portion of the large diameter part so as to form a tapered diameter part 4 and having a small diameter through-hole "b" into which a small diameter ferrule A2 having an optical fiber B inserted and fixed therein is fitted, the sleeve having a slit 5 formed in the longitudinal direction thereof so as to elastically hold the ferrules A1 and A2 having different diameters. The large diameter part and the small diameter part are integrally formed of metal or plastic.

A conversion sleeve is required to have lower loss of light, when ferrules having the different diameters, for example 2.50 mm and 1.25 mm, are connected. Accordingly, it is required that the deviation of one center from the other (offset) of ferrules should be 1 micron or less.

In the case of the precision sleeve, the axial deviation and the accuracy of the inner diameter is significant. Since the highly accurate processing is difficult, it poses the problem that the processing cost becomes high.

On the other hand, in the case of the elastic sleeve, although the accuracy of the inner diameter is not so significant, crookedness (the state where the SC ferrule and the MU ferrule are not aligned in a completely straight line) will arise by elastic deformation of the sleeve. In this case, the problem of deviation in the contact position will arise. Furthermore, if the length of the leading part of the ferrule changes due to re-polishing or other causes, it will pose the problems that the deviation in the contact position will occur similarly, the offset becomes large, and thus the connection loss becomes large. That is, its weak point is that the contact position is uncertain.

Furthermore, in the case of an elastic conversion sleeve, since the difference in the inner diameter between the opposite sides results in three-dimensional profile with a step, this step portion exerts great influence on the difference in the degree of deformation between of the large diameter part and the small diameter part of the sleeve. Therefore, in order to decrease this difference as small as possible, as an angle of the step portion 45° is adopted instead of 90° in many cases. The sleeve made of such a material as phosphor bronze and a synthetic resin has this profile. When the angle is 45°, however, since the taper at the leading end of the SC ferrule has the angle of 60°, the tip of the ferrule 10 will abut against the tapered part 4 of the conversion sleeve 1 when a connector is inserted (see FIG. 1). That is, the portion at which the tapered diameter part 4 of the conversion sleeve 1 having the angle of 90° comes into contact with the tapered part of the tip of the ferrule having the angle of 60° is the PC contact position of the ferrule. In this case, if the tapered part of the tip of the ferrule having the angle of 60° is always the same length, the PC contact position will be fixed. However, the length of the tapered part having the angle of 60° varies with the PC polishing procedure of the ferrule and the number of repetition of polishing. Accordingly, the PC contact position varies with the connector to be used. As described above, in the elastic conversion sleeve which is provided with a slit to acquire suitable retaining force, there is a problem that the PC contact position will vary with the connectors to be used.

Although the optical fiber which is retained and fixed in the ferrule is positioned along the axis of the ferrule with high accuracy, usually it has practically slight eccentricity to the outer diameter of the ferrule. Therefore, there is a problem that, when the alignment sleeve rotates, it causes a deviation between the axes of the ferrules (the cores of the optical fibers) and the change in the optical characteristics.

Particularly in the optical adapter (conversion adapter) using the conversion sleeve, since the inside of the conversion sleeve has the profile of a hole with a step as mentioned above, it was very difficult to bore two holes from opposite sides so as to coincide the axes thereof with each other with high accuracy in the order of 1 micron or less.

Moreover, even when the optical connectors each having the optical fiber retained and fixed in the center of the ferrule thereof are connected by using the conversion adapter mentioned above, if the conversion sleeve rotates within the adapter each time the optical connectors are connected, the so-called axial deviation in the connecting point becomes larger. This poses the problem that the connection loss becomes larger.

SUMMARY OF THE INVENTION

It is, therefore, an object of the present invention to solve the problems of the conventional technology as mentioned above and to provide a conversion sleeve which can establish the PC contact of the ferrules of different diameters inserted thereinto always in a fixed position, thereby lowering the axial deviation (offset) of optical fibers as much as possible and attaining stable connection of the ferrules having different diameters with constantly low connection loss, without causing any scattering of results.

A further object of the present invention is to provide an optical adapter, particularly a conversion adapter, which can prevent rotation of an alignment sleeve, thereby lowering the axial deviation (offset) of ferrules (optical fibers) inserted therein as low as possible and attaining stable optical connection with constantly low connection loss, without causing any scattering of results.

To accomplish the object mentioned above, the present invention provides a conversion sleeve comprising a large diameter part, a small diameter part, and a tapered diameter part interconnecting said two parts, wherein a ferrule insertion stop part is formed on the inner circumferential surface of the tapered diameter part mentioned above and/or the inner circumferential surfaces of the large diameter part and the small diameter part adjacent to the tapered diameter part.

In accordance with the present invention, there is further provided an optical adapter comprising a split sleeve having a slit formed therein throughout the entire length in the longitudinal direction thereof and an adapter housing having a sleeve retaining part in which the sleeve is inserted and retained, wherein the sleeve retaining part is provided with an engagement part comprising a recessed portion or/and a projected portion, the split sleeve is provided with a counter engagement part comprising a projected portion or/and a recessed portion which engages with the recessed portion or/and the projected portion of the engagement part mentioned above, and the recessed portion or/and the projected portion of the engagement part or counter engagement part have a width larger than the width of the slit of the split sleeve.

In a particularly advantageously applicable embodiment of the present invention, the split sleeve mentioned above is a conversion sleeve for the ferrules having different diameters, which has a large diameter part into which the ferrule having a large diameter is fitted and a small diameter part into which the ferrule having a small diameter is fitted.

In accordance with a preferred embodiment, the engagement part and the counter engagement part are formed in the sleeve retaining part and an end of the split sleeve, and according to another preferred embodiment, a plurality of engagement parts and counter engagement parts are formed.

The present invention includes each embodiment of the conversion sleeve and the optical adapter mentioned above independently. For instance, the optical adapter mentioned above is applicable to the case using the sleeve for connecting the ferrules having the same diameter. However, a more preferred embodiment includes these features in combination. Incidentally, in this specification, when the split sleeve is used for the conversion of the ferrules having different diameters, it is referred to as the "conversion sleeve". In the similar meaning, when the optical adapter contains the conversion sleeve, it is referred to as the "conversion adapter".

BRIEF DESCRIPTION OF THE DRAWINGS

Other objects, features, and advantages of the invention will become apparent from the following description taken together with the drawings, in which.

DETAILED DESCRIPTION OF THE PREFERRED EMBODIMENTS

As described above, in the conversion sleeve accompanied by elastic deformation, for example, when the SC ferrule and the MU ferrule are connected, a slight axial inclination (about 0.1°) may arise. In the case of the inclination of 0.1°, if the contact position shifts 0.5 mm in the axial direction, the axial deviation (offset) of about 1 $\mu$m of optical fibers will arise. This will result in such a problem that the connection loss becomes large and the variation in the connection loss arises.

On the contrary, in the conversion sleeve of the present invention, since the ferrule insertion stop part is formed on the inner circumferential surface of the tapered diameter part of the conversion sleeve mentioned above and/or the inner circumferential surfaces of the large diameter part and the small diameter part adjacent to the tapered diameter part, the connection is performed in such state that the leading end face of one ferrule inserted into the sleeve abuts against this ferrule insertion stop part. Accordingly, it is possible to always keep the PC contact position fixed. This will bring the effects that the offset becomes constant and the connection loss is stable. Moreover, since there is no contact of the edge of the leading end of the ferrule to the conversion sleeve, it is possible to expect the effect of suppressing the generation of abrasion powder which deteriorates the connection loss.

In accordance with another mode of the present invention, in an optical adapter comprising a split sleeve for connecting opposed ferrules by abutting against each other and an adapter housing having a sleeve retaining part in which the split sleeve is inserted and retained, the adapter housing is provided with the mechanism for stopping the rotation of the split sleeve. By adopting this rotation stopping mechanism, it is possible to lower the axial deviation (offset) of the optical fibers as low as possible and establish the stable optical connection always with constantly low connection loss, without causing any scattering of results.

As the mechanism for stopping the rotation of the split sleeve relative to the adapter housing, since the split sleeve already has a slit in the longitudinal direction thereof, it is possible to employ this slit. For example, it is possible to form on the sleeve retaining part of the adapter housing a projection having such a size that it can be inserted into the slit of the sleeve. However, since the width of the slit is very small, the width of the projection to be inserted in this slit should also be small. Accordingly, there is a problem that the projection will be broken when the force is applied thereto. Further, the height of the projection formed on the sleeve retaining part should be limited to a level smaller than the wall thickness (usually 0.2 mm) of the split sleeve. Therefore, such a small projection will often separate from the slit, which eventually results in the scattering of the optical characteristics.

Therefore, in accordance with another embodiment of the present invention, there is provided the optical adapter provided with the rotation stopping mechanism composed of an engagement part formed in the sleeve retaining part and comprising a recessed portion (or groove) or/and a projected portion (or protruded portion) and a counter engagement part formed in the split sleeve and comprising a projected portion or/and a recessed portion which is destined to engage with the recessed portion or/and the projected portion of the engagement part mentioned above, preferably the width of the recessed portion or/and the projected portion of the engagement part or the counter engagement part being larger than the width of the slit of the split sleeve.

Specifically, since the width of the recessed portion or/and the projected portion of the engagement part or the counter engagement part is formed to the size larger than the width of the slit of the split sleeve, it is possible to stably effect stopping of the rotation of the split sleeve relative to the adapter housing, without causing any problem mentioned above. As a result, it is possible to lower the axial deviation (offset) of the opposed optical fibers as low as possible and establish the stable optical connection always with constantly low connection loss, without causing any scattering of results.

The engagement part and the counter engagement part has such a relation that when the one consists of a recessed portion, the other consists of a projected portion which engages with the recessed portion. When the one consists of a projected portion, the other consists of a recessed portion. Further, When the one consists of a combination of the recessed portion and the projected portion, the other consists of a combination of the projected portion and the recessed portion which engage with the formers. Any mode may be adopted and a plurality of these portions may be formed in arbitrary combination. Moreover, with respect to the engagement part and the counter engagement part, when the one is formed in the sleeve retaining part, the other should be formed in the split sleeve.

Incidentally, when the projected portion is formed in the sleeve retaining part, the height of the projected portion should be suppressed to a level not more than the wall thickness of the split sleeve. However, since the wall thickness of the sleeve retaining part of the adapter housing is larger than the wall thickness of the split sleeve, there is no such restriction when the projected portion is formed in the split sleeve. In this case, since the higher projected portion can be formed in the split sleeve, there is obtained the effect that the separation of the projected portion from the recessed portion can be securely prevented. Moreover, when the engagement part and the counter engagement part are formed in the end portions of the sleeve retaining part and the split sleeve, there is obtained another advantage that the attachment and engagement of the split sleeve to the sleeve retaining part can be performed easily because this case takes such a mode that the split sleeve is inserted in the sleeve retaining part from one side of the sleeve retaining part and engaged therewith. Furthermore, if a plurality of engagement parts and counter engagement parts are provided, the stopping of the rotation of the split sleeve relative to the adapter housing can be more securely effected.

Now, the present invention will be described more concretely below with reference to the attached drawings which illustrate some embodiments.

Figure 2:
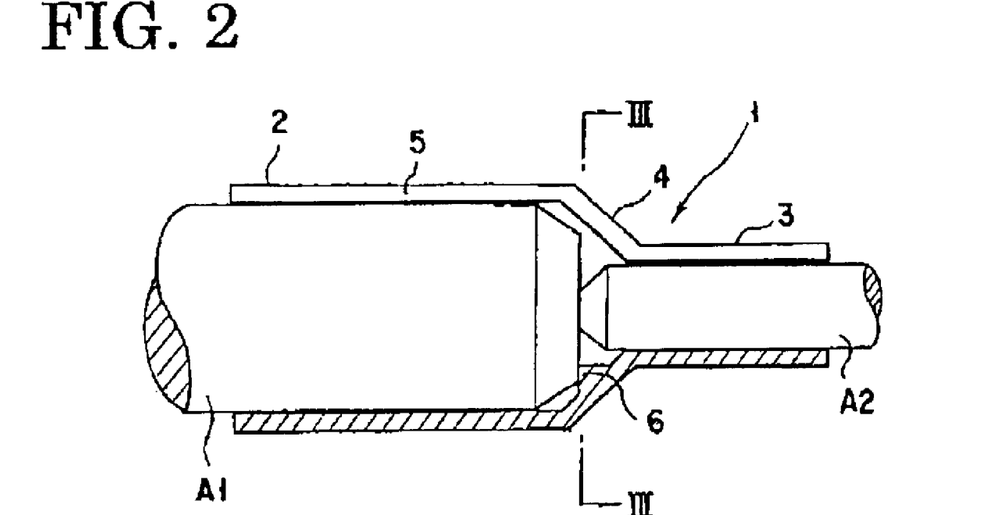
FIG. 2 is a longitudinal cross-sectional view schematically illustrating an example of the conversion sleeve of the present invention.
Figure 3:
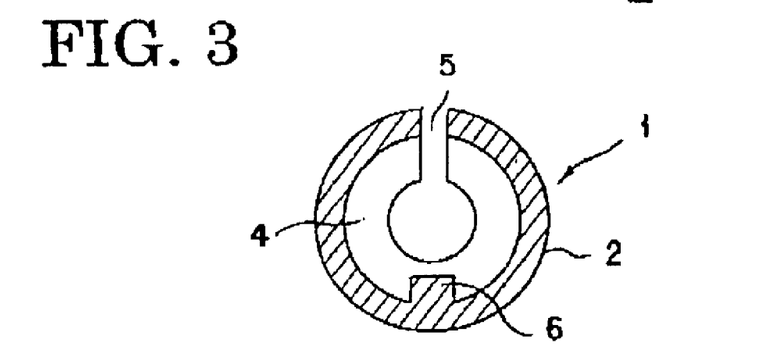
FIG. 3 is a cross-sectional view of the conversion sleeve shown in FIG. 2 taken along the line III—III.

FIG. 2 and FIG. 3 illustrate one preferred embodiment of the conversion sleeve according to the present invention. This conversion sleeve 1 comprises a large diameter part 2 having a large diameter through-hole formed therein to which a large diameter ferrule A1 having an optical fiber (not shown) inserted and fixed therein is fitted, a small diameter part 3 having a small diameter through-hole formed therein to which a small diameter ferrule A2 similarly having an optical fiber (not shown) inserted and fixed therein is fitted, and a tapered diameter part 4 disposed between the large diameter part 2 and the small diameter part 3 and connecting them with a gentle slope of a predetermined angle. The sleeve has a slit 5 formed therein throughout the entire length from the free end of the large diameter part 2 to the opposite free end of the small diameter part 3 in the longitudinal direction thereof so as to elastically hold the ferrules A1 and A2 having different diameters. Further, a projection-like ferrule insertion stop part 6 is formed in the inner circumferential surface of the tapered diameter part 4 so that the surface on the side of the large diameter part becomes a perpendicular flat plane. Accordingly, since the leading end face of the large diameter ferrule A1 inserted into the sleeve from the large diameter part 2 side abuts against the ferrule insertion stop part 6 and the further insertion is prevented, the PC contact position of ferrules A1 and A2 is always fixed.

Although in the above-mentioned embodiment only one ferrule insertion stop part 6 is formed in the inner circumferential surface of the tapered diameter part 4, it is possible to form a few ferrule insertion stop parts at predetermined intervals to effect stop at several points. Further, it is also possible to enlarge the contact surface of the ferrule insertion stop part 6. One example thereof is shown in FIG. 4.

Figure 4:
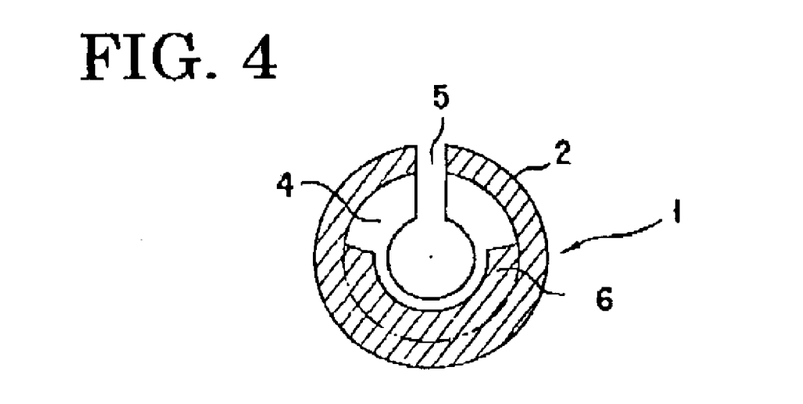
FIG. 4 is a cross-sectional view schematically illustrating another example of the conversion sleeve of the present invention.

In the case of the conversion sleeve 1 shown in FIG. 4, the ferrule insertion stop part 6 is formed in the inner circumferential surface of the tapered diameter part 4 so large that it extends in the range slightly larger than the half of the entire circumference to enlarge the contact surface.

It is preferred that the length of the circumferential direction of the ferrule insertion stop part 6, i.e. the angle of the circumferential direction should be not more than 270°, preferably not more than 180° in relation to 360° of the entire circumference. This holds good for the total amount (total angle) when a plurality of ferrule insertion stop parts are formed.

The PC contact position, i.e. the vertical plane of the ferrule insertion stop part 6 on the large diameter part side may shift to a large diameter part side except the case that it is located in the inner circumferential surface of the tapered diameter part as in the case of the embodiment mentioned above.

Figure 5:
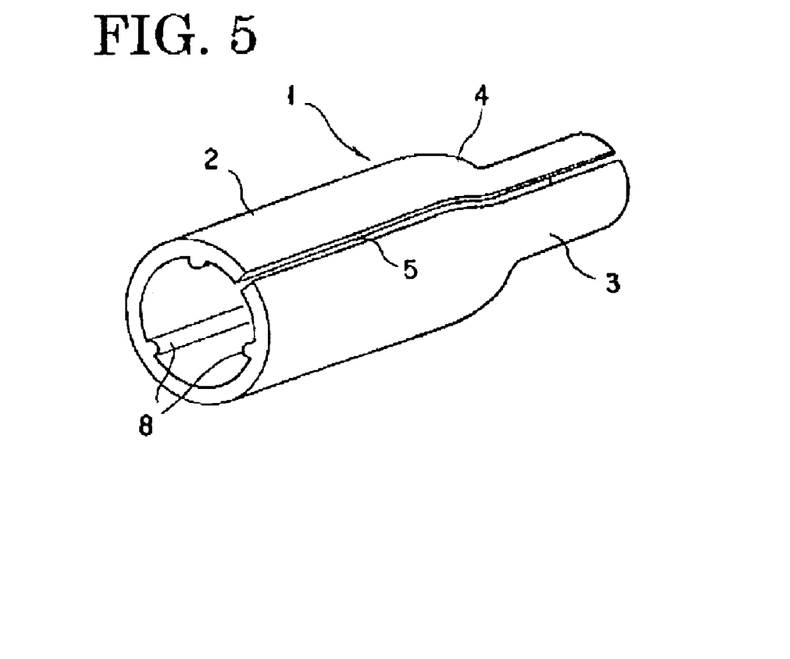
FIG. 5 is a perspective view schematically illustrating still another example of the conversion sleeve of the present invention.
Figure 6:
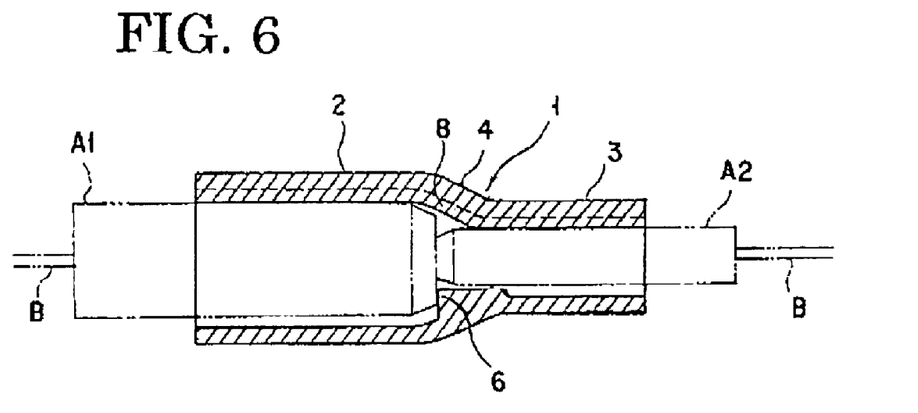
FIG. 6 is a longitudinal cross-sectional view schematically illustrating the example of the conversion sleeve shown in FIG. 5.

Further, as shown in FIG. 5 and FIG. 6, to enable the conversion sleeve 1 to retain the ferrules A1, A2 therein in a state nipped at three points contacting the outside surfaces of the ferrules, ridges (elongated elevations) 8 of substantially semicircular cross section having an arcuate upper face convex toward the axis of the sleeve may be formed on the inner circumferential surface of the conversion sleeve 1 at three points as extended from one to the other end thereof in the longitudinal direction thereof. The ridges may be formed into a cross section such as, for example, a substantially semielliptic cross section, a triangular cross section containing a rounded upper end, etc. In this case, when the conversion sleeve is a precision sleeve, the gaps formed by the ridges function as air relief portions when the ferrules are inserted into the sleeve. The ridges are preferred to be disposed as equally spaced at three points on the inner circumferential surface of the conversion sleeve, though a slight deviation in the regular spacing is tolerable. While the ridges are preferred to be a continued elevation, they may discontinuously extend throughout the sleeve as occasion demands. By having the ridges 8 of this description provided on the inner circumferential surface of the conversion sleeve 1, the ferrule insertion stop part 6 may be formed on the inner circumferential surface in the region from the tapered diameter part 4 to the small diameter part 3 because the gaps are formed between the inner circumferential surface of the conversion sleeve 1 and the ferrules A1, A2 inserted thereinto.

Figure 7:
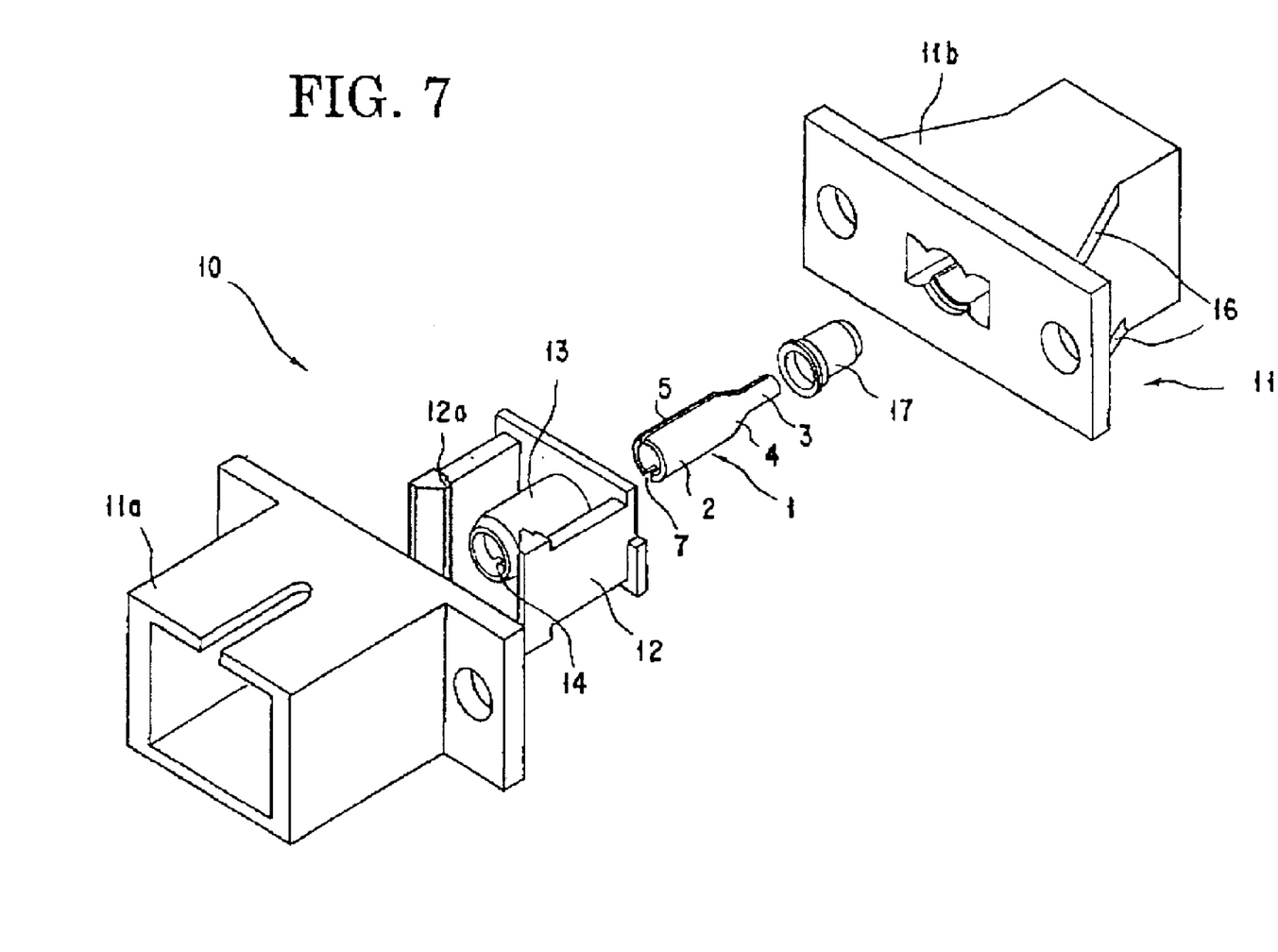
FIG. 7 is an exploded perspective view schematically illustrating an example of the optical adapter of the present invention.

In FIG. 7 through FIG. 10, the reference numeral 1 denotes a split sleeve (conversion sleeve), 10 denotes an optical adapter (conversion adapter), respectively. The conversion sleeve 1 comprises, as shown in FIG. 7, a large diameter part 2 having a large diameter through-hole formed therein to which a large diameter ferrule (not shown) having an optical fiber fixed therein is fitted, a small diameter part 3 having a small diameter through-hole formed therein to which a small diameter ferrule (not shown) similarly having an optical fiber fixed therein is fitted, and a tapered diameter part 4 disposed between the large diameter part 2 and the stall diameter part 3 and connecting them with a gentle slope of a predetermined angle. The conversion sleeve 1 has a slit 5 formed therein throughout the entire length from the free end of the large diameter part 2 to the opposite free end of the small diameter part 3 in the longitudinal direction thereof so as to elastically hold the ferrules having different diameters and also a recessed portion 7 at one end portion thereof opposite to the slit 5 of the large diameter part 2. The conversion sleeve is fitted and fixed in an adapter housing 11 of the conversion adapter 10.

Figure 8:
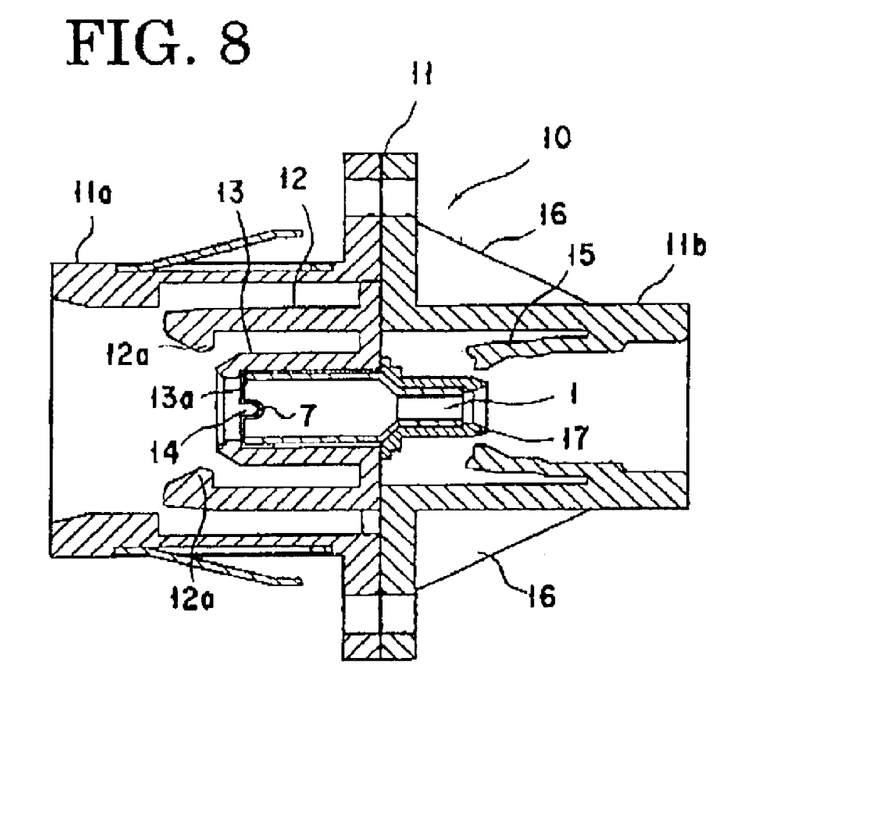
FIG. 8 is a longitudinal cross-sectional view schematically illustrating the example of the optical adapter of the present invention shown in the assembled state.
Figure 9:
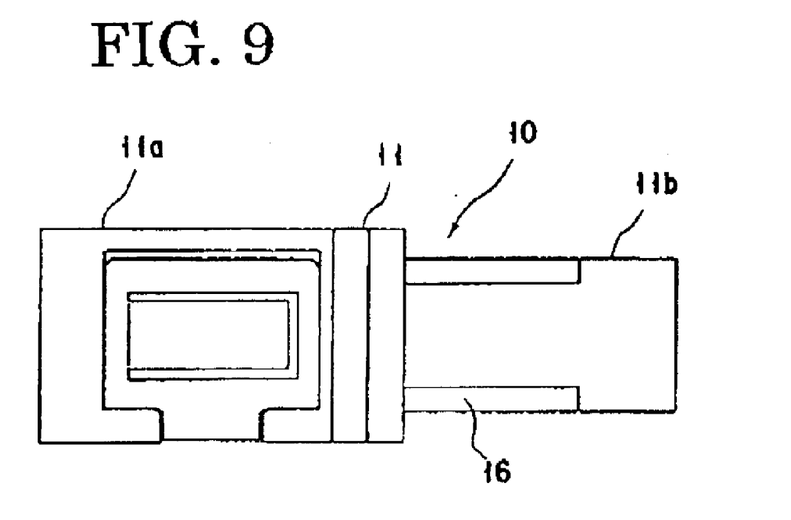
FIG. 9 is a plan view schematically illustrating the optical adapter shown in FIG. 8.
Figure 10:
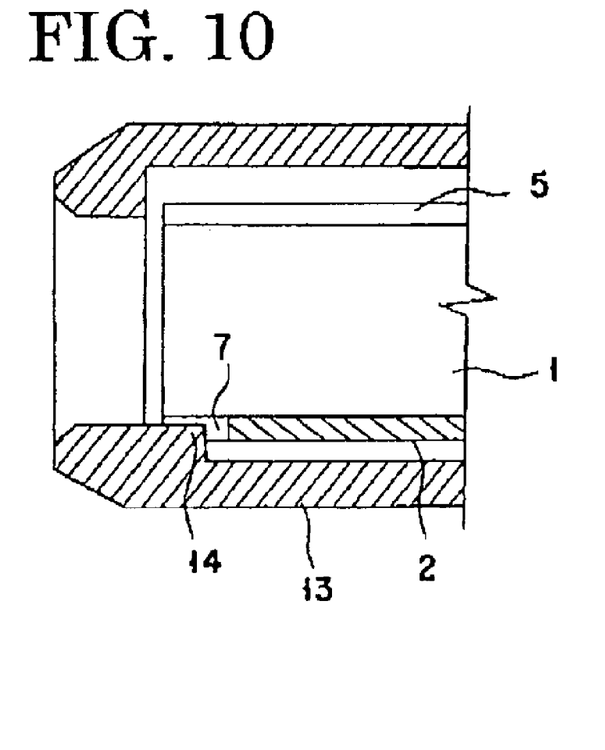
FIG. 10 is a partial longitudinal cross-sectional view schematically illustrating the engaged state of the sleeve retaining part and the conversion sleeve.

On the other hand, the adapter housing 11 of the conversion adapter 10 comprises the housing halves 11a and 11b on either side connected to each other at their flange parts and unified. A large fitting sleeve 12 provided with a sleeve retaining part (axial cylindrical part) 13 in the central portion thereof and a pair of hooks 12a is fitted into the one housing half 11a. The sleeve retaining part 13 is provided at its end inner circumferential surface a projected portion 14 which is destined to engage with the recessed portion 7 of the above-mentioned conversion sleeve 1. Further, a small fitting sleeve 15 is formed on the inside of the housing half 11b of another side, and a pair of parallel reinforcing ribs 16 are formed on the surface at right and left sides, respectively. By the formation of such reinforcement ribs 16, even when the housing portion is made from a plastic material and has a thin wall thickness, its mechanical strength can be improved so that no deformation will occur. Accordingly, there is obtained such an advantage that the optical characteristic is stabilized.

In the assembly of the conversion adapter 10, the large diameter part 2 of the conversion sleeve 1 is fitted into the sleeve retaining part 13 of the large fitting sleeve 12 which is fitted in one housing half 11a, and the projected portion 14 formed on the end inner circumferential surface of the sleeve retaining part 13 is engaged with the recessed portion 7 of the above-mentioned conversion sleeve 1, thereby abutting the end portion of the conversion sleeve 1 of the large diameter part 2 side against a step portion 13a formed in the end of the sleeve retaining part 13. A sleeve retaining ring member 17 is attached to the small diameter part 3 side of the conversion sleeve 1. Then, by connecting the housing half 11b to the housing half 11a, the assembly is completed. In the state assembled as above, since the projected portion 14 formed in the end inner circumferential surface of the sleeve retaining part 13 is engaging with the recessed portion 7 of the above-mentioned conversion sleeve 1, as shown in a FIG. 10, the conversion sleeve 1 does not turn.

Figure 11:
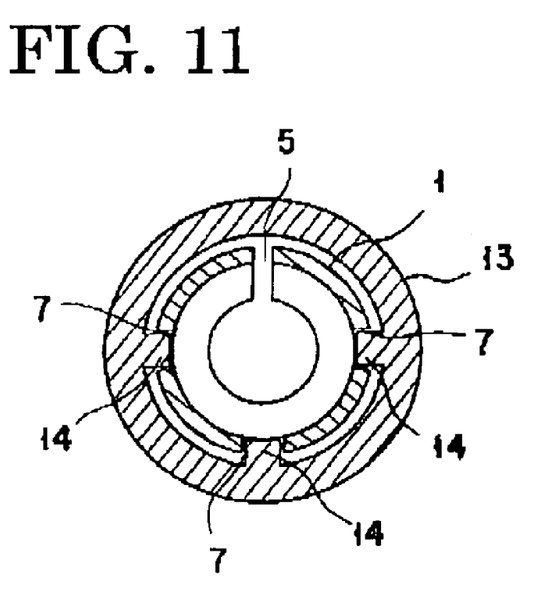
FIG. 11 is a cross-sectional view schematically illustrating another engagement example of the sleeve retaining part and the conversion sleeve.

FIG. 11 shows a modification example of the engagement state of the projected portion 14 formed in the end inner circumferential surface of the sleeve retaining part 13 and the recessed portion 7 of the conversion sleeve 1. Although in the above-mentioned embodiment one projected portion 14 is formed in the end inner circumferential surface of the sleeve retaining part 13 and one recessed portion 7 is similarly formed in the end of the conversion sleeve 1, in the embodiment shown in FIG. 11 three projected portions 14 and three recessed portions 7 are formed, respectively. By forming a plurality of engagement parts and counter engagement parts as mentioned above, it is possible to stop the rotation of the conversion sleeve more securely.

Figure 12:
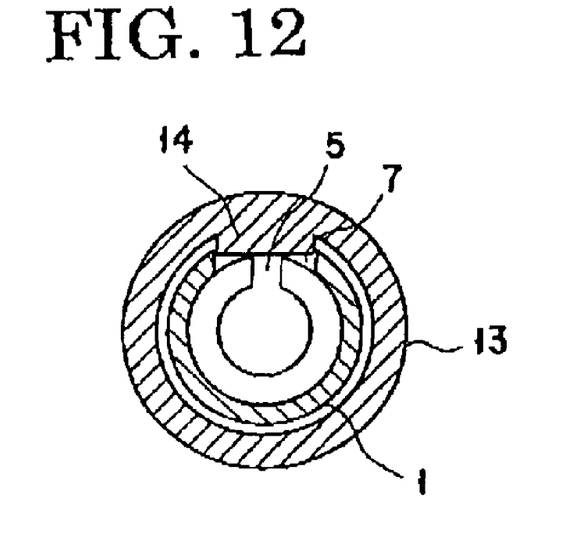
FIG. 12 is a cross-sectional view schematically illustrating still another engagement example of the sleeve retaining part and the conversion sleeve.
Figure 13:
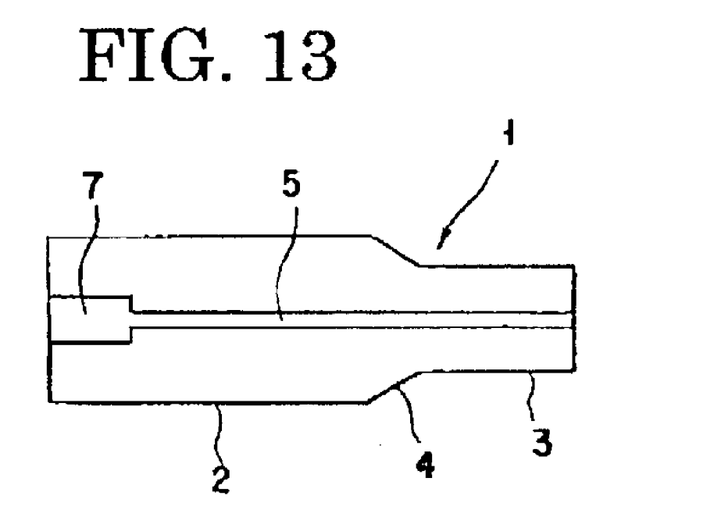
FIG. 13 is a plan view schematically illustrating the conversion sleeve shown in FIG. 12.

FIG. 12 and FIG. 13 show another modification example of the engagement state of the projected portion 14 formed in the end inner circumferential surface of the sleeve retaining part 13 and the recessed portion 7 of the conversion sleeve 1. Although in the above-mentioned embodiment the recessed portion 7 is formed in the portion other than slit 5 of the conversion sleeve 1, in the embodiment shown in a FIG. 12 and FIG. 13 the recessed portion 7 is formed in the end side portion of the slit 5 of the large diameter part 2 integrally with the slit 5.

Figure 14:
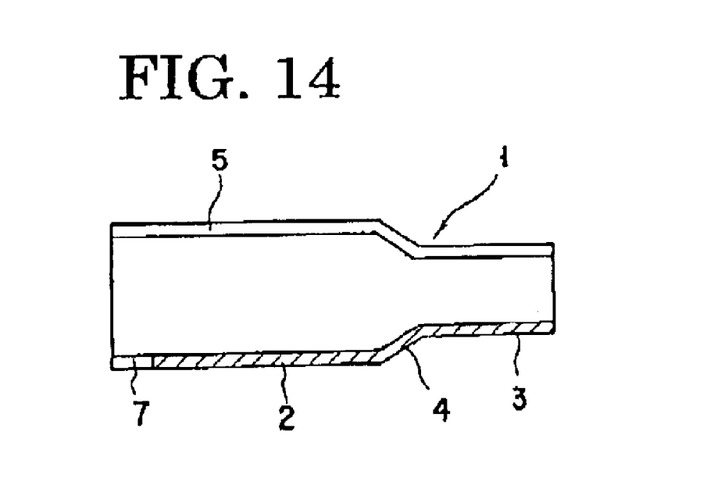
FIG. 14 is a longitudinal cross-sectional view schematically illustrating yet another example of the conversion sleeve.
Figure 15:
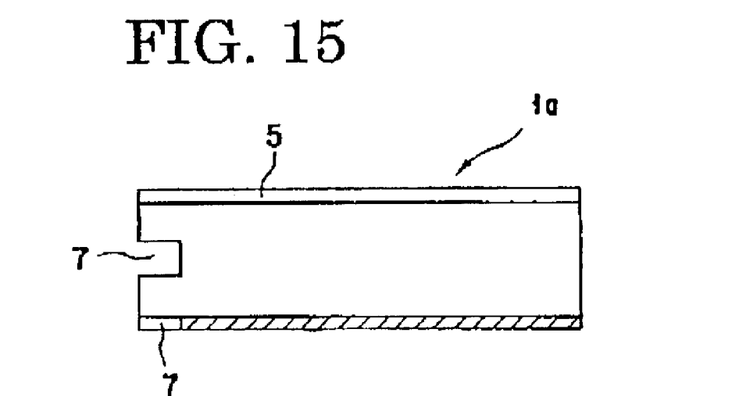
FIG. 15 is a longitudinal cross-sectional view schematically illustrating still another example of the conversion sleeve.
Figure 16:
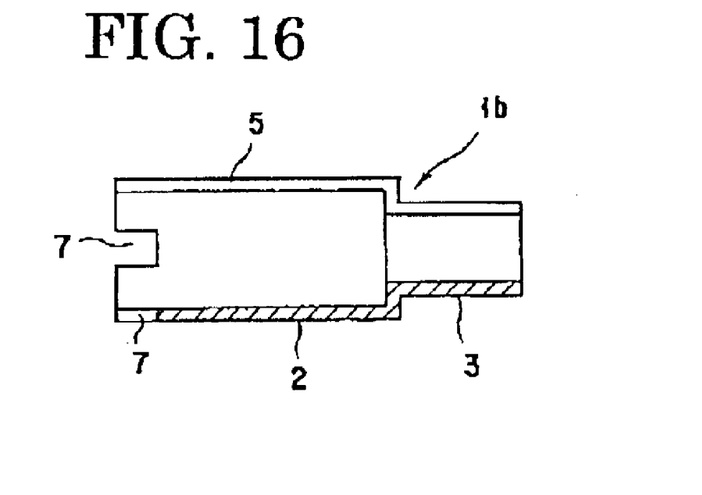
FIG. 16 is a longitudinal cross-sectional view schematically illustrating another example of the conversion sleeve.

FIG. 14 through FIG. 16 shows some other embodiments of the conversion sleeve 1 to which the present invention is applicable. FIG. 14 shows the conversion sleeve 1 comprising, like the embodiments mentioned above, the large diameter part 2, the small diameter part 3, and the tapered diameter part 4 disposed therebetween and connecting them with a gentle slope of a predetermined angle, and has a slit 5 formed therein throughout the entire length from the free end of the large diameter part 2 to the opposite free end of the small diameter part 3 in the longitudinal direction thereof so as to elastically hold the ferrules having different diameters and also has the recessed portion 7 formed in an end portion opposite to the slit 5 of the large diameter part 2. On the other hand, in the case of the alignment sleeve 1a shown in FIG. 15, it is a cylindrical split sleeve for connecting the ferrules having the same diameter and three recessed portions 7 are formed in one end portion other than slit 5. In the case of the alignment sleeve 1b shown in FIG. 16, though it is a conversion sleeve for connecting the ferrules having different diameters, unlike the embodiments mentioned above, the large diameter part 2 and the small diameter part 3 are integrally connected so as to form the step-like portion therebetween. Further, three recessed portions 7 are formed in one end portion other than slit 5 of the large diameter part 2.

Figure 17:
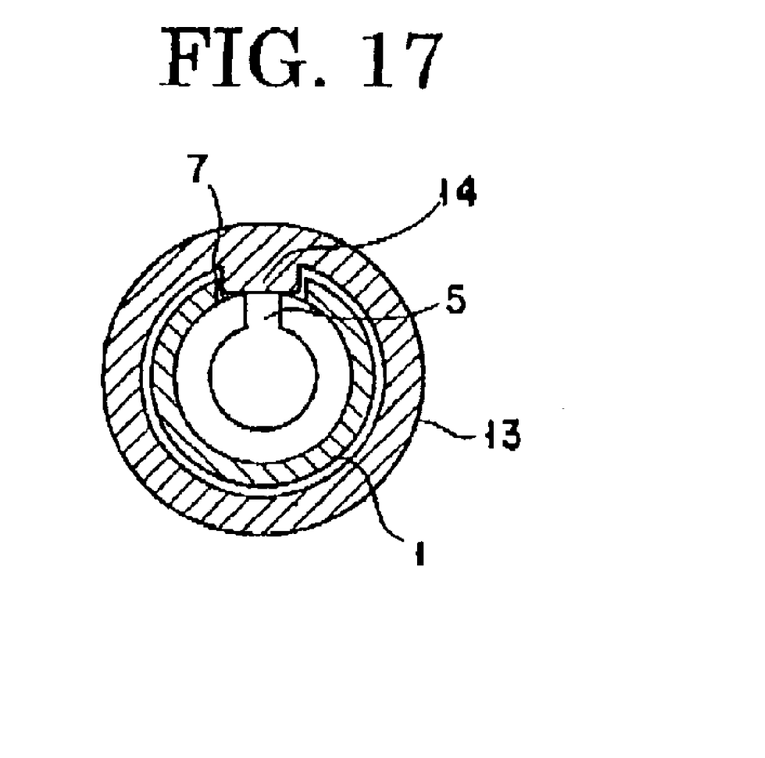
FIG. 17 is a cross-sectional view schematically illustrating yet another engagement example of the sleeve retaining part and the conversion sleeve.
Figure 18:
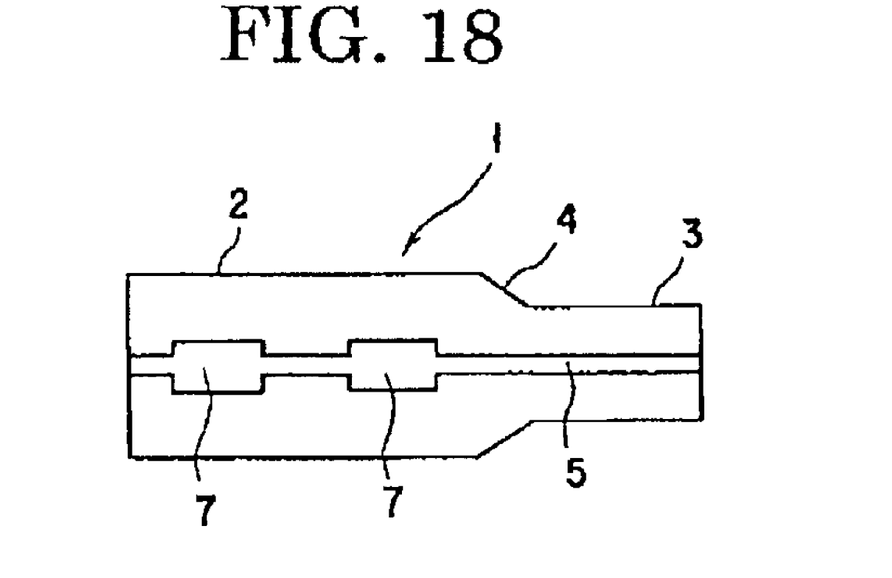
FIG. 18 is a plan view schematically illustrating the conversion sleeve shown in FIG. 17.

FIG. 17 and FIG. 18 show still another modification example of the engagement state of the projected portion 14 formed in the end inner circumferential surface of the sleeve retaining part 13 and the recessed portion 7 of the conversion sleeve 1. In the embodiment shown in FIG. 17 and FIG. 18, two recessed portions 7 are formed along the slit 5 on the side of the large diameter part 2 integrally with the slit 5 and two projected portions 14 are formed in the inner circumferential surface of the sleeve retaining part 13 at the position corresponding to the recessed portions.

Figure 19:
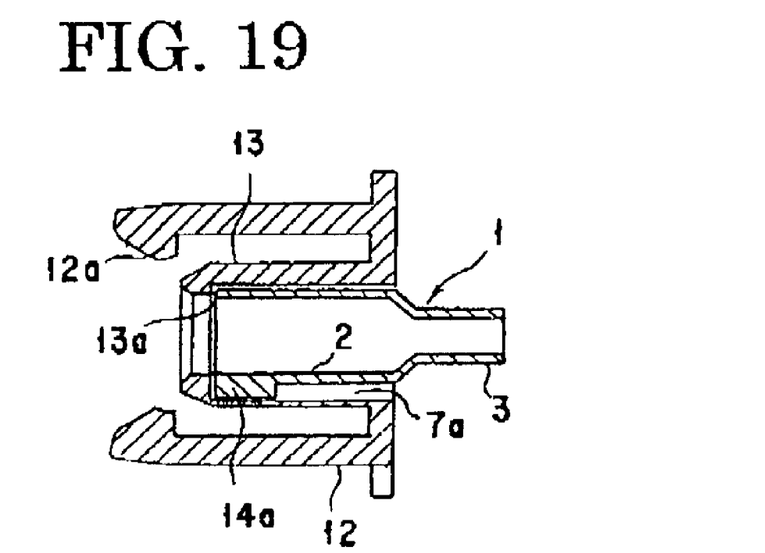
FIG. 19 is a longitudinal cross-sectional view schematically illustrating yet another engagement example of the sleeve retaining part and the conversion sleeve.
Figure 20:
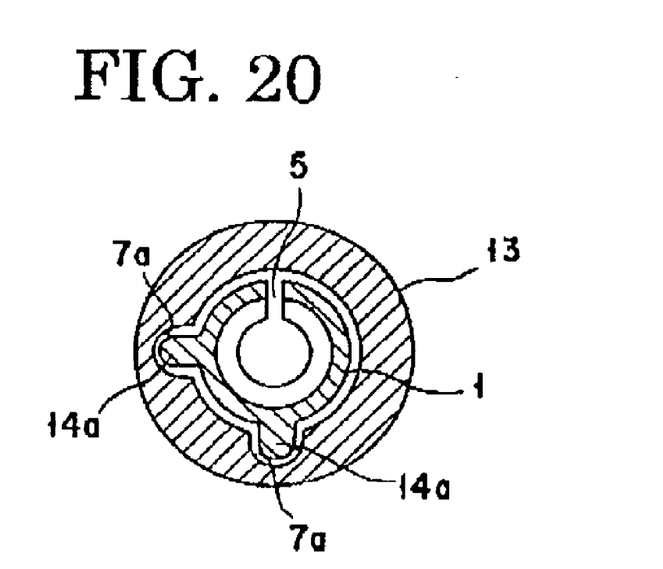
FIG. 20 is a cross-sectional view schematically illustrating the engagement example of the sleeve retaining part and the conversion sleeve shown in FIG. 19.

FIG. 19 and FIG. 20 show the embodiment in which the positional relation of the engagement part and the counter engagement part formed in the sleeve retaining part 13 and the conversion sleeve 1 is reversed. Specifically, in this embodiment two recessed portions (grooves) 7a are formed in the inner circumferential surface of the sleeve retaining part 13 and two projected portions 14a which are destined to engage with the recessed portions are formed in the end portion of the conversion sleeve 1 of the large diameter part 2 side. When a recessed portion (groove) 7a is formed in the inner circumferential surface of the sleeve retaining part 13 as in this embodiment (recessed portion may be one or two or more), it is possible to form the higher projected portion 14a because the wall thickness of the sleeve retaining part 13 is larger than that of the conversion sleeve 1. Accordingly, there is obtained the effect that that the separation of the projected portion 14a from the recessed portion (groove) 7 can be securely prevented.

Figure 21:
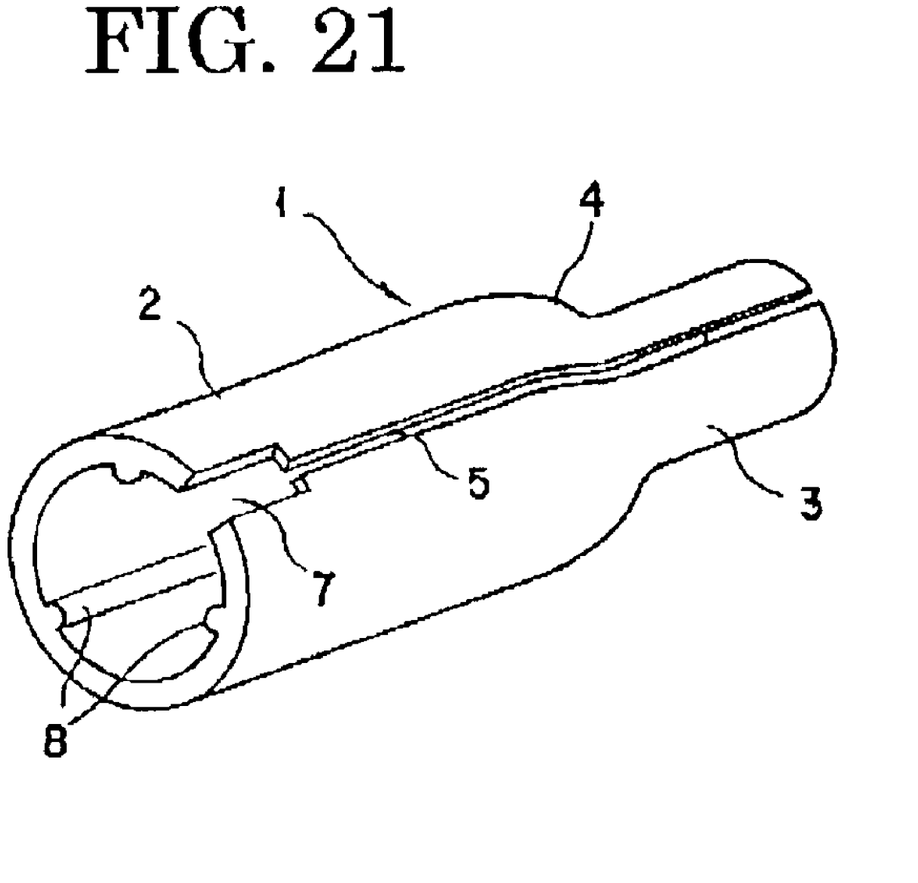
FIG. 21 is a perspective view schematically illustrating still another example of the conversion sleeve of the present invention.

Further, as shown in FIG. 21 and FIG. 6, besides the recessed portion 7 formed in the end portion of the slit 5 on the large diameter part 2 side, it is also possible to form ridges (elongated elevations) 8 of substantially semicircular cross section having an arcuate upper face convex toward the axis of the sleeve on the inner circumferential surface of the conversion sleeve 1 at three points as extended from one to the other end thereof in the longitudinal direction thereof, for the purpose of retaining the ferrules A1, A2 therein in a state nipped at three points contacting the outside surfaces of the ferrules.

While certain specific embodiments have been disclosed herein, the invention is not limited to the embodiments described above. Insofar as the conversion sleeve is provided with a ferrule insertion stop part or the optical adapter is provided with an engagement part and a counter engagement part in accordance with the present invention, the invention may be embodied in other specific forms. It is needless to say that, for example, the present invention is applicable not only to the elastic sleeve mentioned above but also to the precision sleeve as long as and the tapered diameter part is formed between the large diameter part and the small diameter part and connecting them with a gentle slope of a predetermined angle so that the ferrule insertion stop part may be formed thereon. Further, the ferrule insertion stop part may be formed so as to project inward from the slit surface on one side or both sides of the the large diameter part and the small diameter part. The recessed portion and the projected portion may have any arbitrary shape. In the case of the elastic sleeve, besides the continuous slit extending from one end of the large diameter part to the opposite end of the small diameter part as in the embodiments mentioned above, a plurality of slits may be formed independently in the large diameter part and the small diameter part, respectively. By providing the large diameter part and the small diameter part with respective independent slits, the slits function as the air relief portions when the ferrule is inserted into the sleeve and, in addition thereto, it will be easy to design the sleeve so as to give to the small diameter part and to the large diameter part equal force for holding the small diameter ferrule and the large diameter ferrule by changing the widths of respective slits or by changing the number of slits.

The described embodiments are therefore to be considered in all respects as illustrative and not restrictive, the scope of the invention being indicated by the appended claims rather than by the foregoing description and all changes which come within the meaning and range of equivalency of the claims are, therefore, intended to be embraced therein.

The disclosures in Japanese Patent Application No. 2002-81909 of Mar. 22, 2002 and Japanese Patent Application No. 2002-102871 of Apr. 4, 2002 are incorporated here by reference. These Japanese Patent Applications describe the invention described hereinabove and claimed in the claims appended hereinbelow and provides the basis for a claim of priority for the instant invention under 35 U.S.C. 119.

What is claimed is:

1. An optical adapter, comprising:

a split sleeve having a slit formed therein throughout the entire length in the longitudinal direction thereof and an adapter housing having a sleeve retaining part in which said sleeve is inserted and retained, wherein said sleeve retaining part is provided with an engagement comprising one of a recessed portion and a projected portion, said split sleeve is provided with a counter engagement part comprising the other of said recessed portion and said projected portion which engages with said one of the recessed portion and the projected portion of said engagement part, the recessed portion and the projected portion of the engagement part or counter engagement part have a width larger than the width of said slit of the split sleeve, and said split sleeve is a conversion sleeve comprising a large diameter part, a small diameter part, and a tapered diameter part interconnecting said two parts, said split sleeve being provided with an inwardly projected ferrule insertion stop part formed on one of an inner circumferential surface of said tapered diameter part and inner circumferential surfaces of the large diameter part and the small diameter part adjacent to said tapered diameter part.

2. The optical adapter according to claim 1, wherein said engagement part and said counter engagement part are formed in said sleeve retaining part and an end of said split sleeve.

3. The optical adapter according to claim 1, which comprises a plurality of engagement parts and counter engagement parts.

4. The optical adapter according to claim 1, wherein said projected ferrule insertion stop part has a flat plane perpendicular to an axis of the split sleeve on the side of the large diameter part.

* * * * *